(12) United States Patent
Grim, III et al.

(10) Patent No.: US 8,874,544 B2
(45) Date of Patent: Oct. 28, 2014

(54) SYSTEM AND METHOD FOR EXPOSING INTERNAL SEARCH INDICES TO INTERNET SEARCH ENGINES

(75) Inventors: Clifton E. Grim, III, Seabrook, TX (US); Christopher I. Schmidt, Friendswood, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 11/034,492

(22) Filed: Jan. 13, 2005

(65) Prior Publication Data

US 2006/0155685 A1    Jul. 13, 2006

(51) Int. Cl.
*G06F 17/30* (2006.01)

(52) U.S. Cl.
CPC ............... *G06F 17/30864* (2013.01)
USPC ........... 707/707; 707/706; 707/708; 707/709; 707/711; 707/712; 707/713; 707/722; 707/736; 707/758; 707/781; 713/153

(58) Field of Classification Search
USPC ............... 707/1, 10, 102, 706–709, 711–713, 707/722, 736, 758, 781, 999.001–6; 705/26; 713/153
See application file for complete search history.

(56) References Cited

U.S. PATENT DOCUMENTS

| | | | |
|---|---|---|---|
| 5,629,980 A | 5/1997 | Stefik et al. | |
| 5,634,012 A | 5/1997 | Stefik et al. | |
| 5,715,403 A | 2/1998 | Stefik | |
| 5,892,900 A | 4/1999 | Ginter et al. | |
| 5,910,987 A | 6/1999 | Ginter et al. | |
| 5,910,988 A | 6/1999 | Ballard | |
| 6,105,131 A | 8/2000 | Carroll | |
| 6,182,050 B1 | 1/2001 | Ballard | |

(Continued)

FOREIGN PATENT DOCUMENTS

| | | | | |
|---|---|---|---|---|
| EP | 1 143 349 | * | 10/2001 | ............. G06F 17/30 |
| EP | 1 143 349 A1 | | 10/2001 | |
| WO | 02/29516 | | 4/2002 | |

OTHER PUBLICATIONS

M. Kobayashi, et al., "Information Retrieval on the Web", ACM Computing Surveys, vol. 32, No. 2, Jun. 2000, pp. 145-173.

(Continued)

*Primary Examiner* — Syling Yen
(74) *Attorney, Agent, or Firm* — Matthew Chung; Roberts Mlotkowski Safran & Cole, P.C.

(57) ABSTRACT

A system and method for exposing internal search indices to Internet search engines. The internal search indices are exposed to external search engines in such a way that the data may be segregated into at least two types including one layer of search data specifically for the search engines, and another for potential users of the application. This significantly improves the probability of discovery by search engines and also provides for presentation of discovered content to users in a manner consistent with the content itself, or consistent with the intended controls or presentations established by the content's owner. The system and method also includes one or more components that reproduce information about IP in a format that search engines can recognize and locate. The component also forwards users coming through the search engines to the actual IP graphical user interface (GUI) instead of the files that the search engine discovered. This allows control over the information that search engines see/view, while ensuring that a user's interface to the system stays constant.

36 Claims, 7 Drawing Sheets

(56) References Cited

U.S. PATENT DOCUMENTS

| | | |
|---|---|---|
| 6,216,229 B1 | 4/2001 | Fischer |
| 6,226,630 B1 | 5/2001 | Billmers |
| 6,247,127 B1 | 6/2001 | Vandergeest |
| 6,334,109 B1 | 12/2001 | Kanevsky et al. |
| 6,338,050 B1 | 1/2002 | Conklin et al. |
| 6,438,690 B1 | 8/2002 | Patel et al. |
| 6,490,575 B1 | 12/2002 | Berstis |
| 6,681,223 B1 | 1/2004 | Sundaresan |
| 6,728,702 B1 | 4/2004 | Subramaniam et al. |
| 6,993,326 B2 | 1/2006 | Link et al. |
| 7,013,388 B2 | 3/2006 | Fisk et al. |
| 7,120,800 B2 | 10/2006 | Ginter et al. |
| 7,124,302 B2 | 10/2006 | Ginter et al. |
| 7,133,845 B1 | 11/2006 | Ginter et al. |
| 7,213,005 B2 | 5/2007 | Mourad et al. |
| 7,222,163 B1* | 5/2007 | Girouard et al. ............ 709/219 |
| 7,249,059 B2 | 7/2007 | Dean et al. |
| 7,272,572 B1* | 9/2007 | Pienkos ........................ 705/26 |
| 7,386,460 B1* | 6/2008 | Frank et al. .................... 705/1 |
| 2001/0007979 A1 | 7/2001 | Teshima |
| 2001/0025255 A1* | 9/2001 | Gaudian ........................ 705/26 |
| 2001/0049651 A1 | 12/2001 | Selleck |
| 2001/0049707 A1* | 12/2001 | Tran .............................. 707/530 |
| 2002/0004775 A1* | 1/2002 | Kossovsky et al. ............ 705/37 |
| 2002/0046038 A1* | 4/2002 | Prokoski ........................ 705/1 |
| 2002/0046127 A1 | 4/2002 | Reding et al. |
| 2002/0107027 A1 | 8/2002 | O'neil |
| 2002/0107803 A1 | 8/2002 | Lisanke et al. |
| 2002/0107812 A1 | 8/2002 | Schmitzek |
| 2002/0112153 A1 | 8/2002 | Wu et al. |
| 2002/0112162 A1 | 8/2002 | Cocotis et al. |
| 2002/0128935 A1 | 9/2002 | White et al. |
| 2002/0183867 A1 | 12/2002 | Gupta et al. |
| 2002/0188841 A1* | 12/2002 | Jones et al. ................... 713/153 |
| 2003/0065642 A1* | 4/2003 | Zee ................................ 707/1 |
| 2003/0079133 A1 | 4/2003 | Breiter et al. |
| 2003/0083961 A1 | 5/2003 | Bezos et al. |
| 2003/0131005 A1 | 7/2003 | Berry |
| 2003/0191716 A1 | 10/2003 | Woods et al. |
| 2003/0204447 A1 | 10/2003 | Dalzell et al. |
| 2003/0204449 A1 | 10/2003 | Kotas et al. |
| 2003/0225693 A1 | 12/2003 | Ballard et al. |
| 2004/0221920 A1 | 11/2004 | Ferguson et al. |
| 2005/0210009 A1* | 9/2005 | Tran ................................ 707/3 |
| 2006/0069611 A1 | 3/2006 | Litt et al. |
| 2006/0085344 A1 | 4/2006 | Grim, III et al. |
| 2006/0085360 A1* | 4/2006 | Grim et al. ...................... 705/67 |

OTHER PUBLICATIONS

D. Dreilinger, et al., "Experiences with Selecting Search Engines Using Metasearch", ACM Transactions on Information Systems, vol. 15, No. 3, Jul. 1997, pp. 195-222.

D. Scott, et al., "Creating a Massive Master Index for HTML and Print", SIGDOC 2002, pp. 186-193.

C. Watters, et al., "GeoSearcher Location-Based Ranking of Search Engine Results", Journal of the American Society for Information Science and Technology, vol. 54, No. 2, pp. 1400-14151, 2003.

Y. Liang, et al., "Enhancing XML Data Processing in Relational System with Indices", Advances in Web-Age Information Management. Second International Conference, WAIM 2001. Proceedings (Lecture Notes in Computer Science, vol. 2118), pp. 168-175, 2001.

F. Bastani et al., "A High-Assurance Measurement Repository System", Proceedings Fifth IEEE International Symposium on High Assurance Systems Engineering (HASE 2000), pp. 265-272.

S. Ye et al., "SCENS: a System for the Mediated Sharing of Sensitive Data", Proceedings of the 2003 Joint Conference on Digital Libraries.

K. Seo et al., "Public-Key Infrastructure for the Secure Border Gateway Protocol (S-BGP)", IEEE, 2001, pp. 239-253.

S. Capkun et al., "Mobility Helps Security in AD Hoc Networks", MobiHoc 2003, pp. 46-56.

L. Zhou et al., "COCA: A Secure Distributed Online Certification Authority", ACM Transactions on Computer Systems, vol. 20, No. 4, Nov. 2002, pp. 329-368.

\* cited by examiner

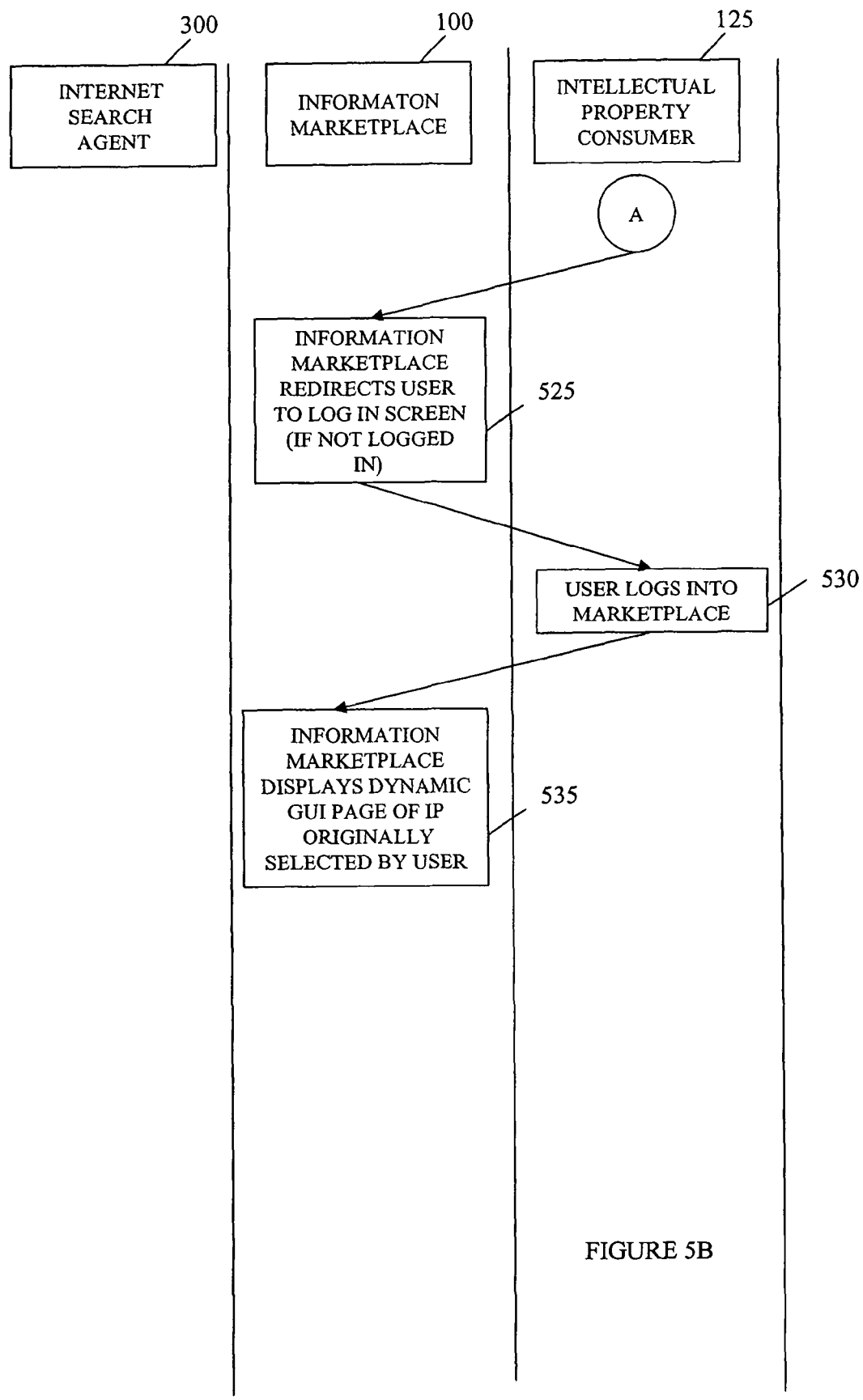

SYSTEM AND METHOD FOR EXPOSING INTERNAL SEARCH INDICES TO INTERNET SEARCH ENGINES

CROSS REFERENCE TO RELATED APPLICATIONS

This application is related to co-pending U.S. application Ser. No. 10/965,486 filed Oct. 14, 2004, and U.S. patent application Ser. No. 10/965,592 filed Oct. 14, 2004, both of which are now incorporated by reference in their entirety herein.

FIELD OF THE INVENTION

The invention generally relates to a system and method for exposing search indices and, more particularly, a system and method for exposing internal search indices to Internet search engines.

Applications accessible via networks such as the World Wide Web (WWW) typically incorporate internal search indices to allow users to find content when performing searches, for example, on topical subjects or keywords. Content from the applications are often incorporated by outside search engines, thus enabling potential users that do not know about the application to find and utilize the application.

The use of Internet search engines has become both a boon and a hindrance to Internet users. Many topics can be researched via these search engines, but they have limitations. These limitations are becoming increasingly apparent as Internet content becomes more dynamic. By example, search engines normally discover content by following links and generating indices from the textual content contained within the content. This technique does not work properly with certain controlled applications such as, for example, an Information Marketplace due to the interface people use to discover subject matter or intellectual property (IP).

Since modern web applications often hinder the ability for search engines to discover content because of their level of dynamic information, new content is often undiscovered in a timely fashion when a user searches. For example, information that is frequently changing or undergoing frequent updates may be prone to fewer hits by search engines. Further, content that is protected or restricted in certain fashions by the content owners may be unreachable or unpresentable to users in a proper context as intended by the content's owner. Thus, both search engines and users may each have undesirable limitations that may adversely influence discovery or proper use of the content.

Therefore, there is a need to present IP or other content within a web site such as an Information Marketplace in a manner such that search engines can effectively and reliably index the internal search indices. At the same time, users who enter the marketplace through a search engine should be presented with the same interface that a user entering the marketplace normally would see, which currently does not occur.

SUMMARY OF THE INVENTION

In an aspect of the invention, a method of facilitating on-line searching is provided. The method comprises the steps of generating one or more metadata files having keyword value pairs from indices to intellectual property at a web site and storing the one or more metadata files as hyper-text markup files (HTML) in a directory accessible through the Internet. The method also includes creating a master index file containing one or more links to each of the one or more metafiles and accessing at least one of the one or more metafiles via the one or more links to locate the intellectual property for commercial or private use.

In another aspect of the invention, a method of exposing search indices is provided. The method comprises the steps of creating one or more metadata files having keyword value pairs from the indices of an information marketplace having intellectual property and storing the one or more metadata files in a directory accessible through a network. The method also includes the steps of creating a master index file containing one or more links to each of the one or more metafiles and accessing at least one of the one or more metafiles via the one or more links to locate the intellectual property for a transaction, commercial use or a private use.

In another aspect of the invention, a system for facilitating on-line searching is provided. The system comprises means for generating one or more metadata files having keyword value pairs from indices to intellectual property at a web site and means for storing the one or more metadata files in a directory accessible on-line. The system also comprises means for creating a master index file containing one or more links to each of the one or more metafiles and means for accessing at least one of the one or more metafiles via the one or more links to locate the intellectual property for at least any one of a transaction, a commercial use and a private use.

In another aspect, a computer program product comprising a computer usable medium having readable program code embodied in the medium is provided. The computer program product includes at least one component to create one or more metadata files having keyword value pairs from the indices of an information marketplace having intellectual property. The component may also store the one or more metadata files in a directory accessible through a network, create a master index file containing one or more links to each of the metafiles and access at least one of the metafiles via the one or more links to locate the intellectual property for at least any one of a transaction, commercial use, and a private use.

BRIEF DESCRIPTION OF THE DRAWINGS

FIGS. 5A and 5B are swim lane diagrams of an embodiment showing steps of a user entering the Information Marketplace through an outside search site.

DETAILED DESCRIPTION OF EMBODIMENTS OF THE INVENTION

Figure 1:
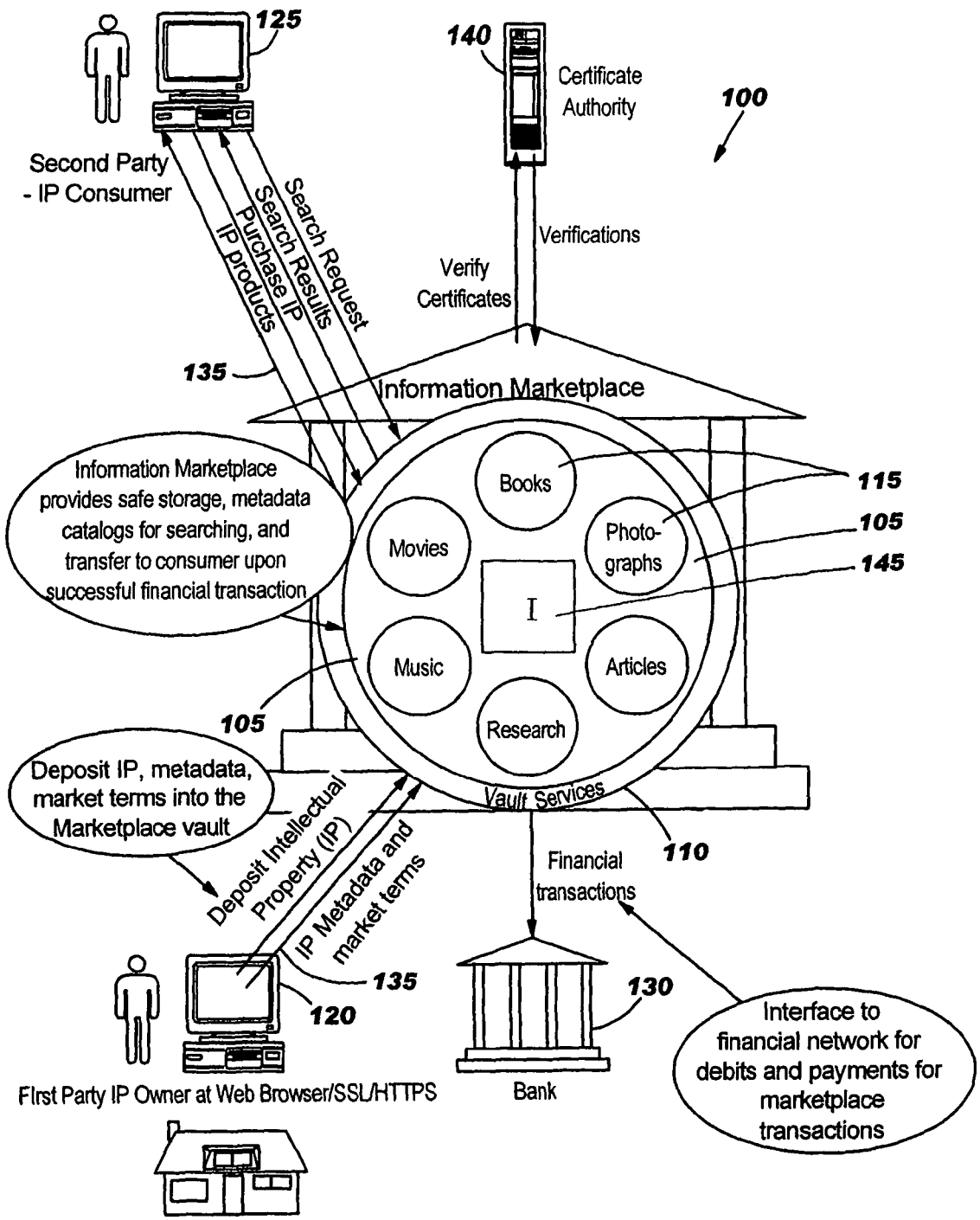
FIG. 1 is an exemplary overview of an embodiment of an Information Marketplace (IM)

This invention is generally directed to a system and method for exposing internal search indices to Internet search engines. The internal search indices are exposed to external search engines in such a way that the data may be segregated into at least two types including: one layer of search data specifically for the search engines, and another for potential users of the application. This significantly improves the probability of discovery by search engines and also provides for presentation of discovered content to users in a manner consistent with the content, itself, or consistent with the intended controls or presentations established by the content's owner.

The system of the invention also includes one or more components that reproduce information about IP in a format that search engines can recognize and locate. The component(s) also forwards users coming through the search engines to the actual IP graphical user interface (GUI), instead of the files that the search engine discovered. This allows control over the information that search engines see/view, while ensuring that a user's interface to the system stays constant.

The system and method of the invention is explained in relation to an Information Marketplace (IM) for which the internal search indices are to be exposed in accordance with the invention. However, the system and method may also be applicable to other information distribution systems, as well, such as webs sites that wish to provide enhanced exposure of internal content. An IM may also provide for the owner of the IP to receive compensation for the use or sale of IP, thus, in effect, the IP becomes a valuable commodity.

IP producers may create information like digital photographs, music, movies, eBooks, composition, research, or the like. The IM provides for the IP producer to bring their creations to an IM that provides ability for IP producers to advertise and sell their material. The IM provides for the safety and security of the IP, and manages the interaction of a buyer and seller by facilitating finding information (i.e., IP) by the buyer. The IM may also handle the financial transaction between the IP owner and the buyer, and may also facilitate transport of the IP product to the buyer/consumer. In this way, the system and method of the invention enables IP producers to sell their own intellectual wares.

By identifying search agents that connect to the IM, the system segregates what information agents receive and what actual users of the system see and use. Requests from search agents may be forwarded to a separate directory with metadata about information in the marketplace. The IM is configured to disallow search agents from searching any directory other than this directory, which contains a set of files. There is a file for each IP stored in the system, and it contains keyword information on the IP. There is also an index file that contains links to each of the IP metadata files in the directory. This allows search agents to include the IP keyword data in their own indices.

When a person uses a search agent that has indexed the marketplace, there is a chance that a search may result in a hit on an item in the system. The link that the search agent provides to the user is the link to the metafile that the search agent indexed originally. To ensure that the user is given a proper interface to see items within the marketplace, the page automatically forwards the user to the real (dynamic) page describing the IP satisfying the search. At this point, the user may be asked to log into the Information Marketplace.

FIG. 1 is an exemplary overview of an embodiment of an Information Marketplace (IM). An IM, generally denoted by reference numeral 100, provides for an information infrastructure to secure and conditionally provide access to stored IP information. The IM 100 employs data storage 105 and security technologies to provide a secure storage mechanism for a user's IP, such as for example, books, movies, articles, music, research, photographs, inventions, software, or the like. The data storage 105 may be one or more physical databases and, in embodiments, may include the databases protected by layered security measures such as firewalls. This secured storage mechanism and structure and associated services are known as an information vault, or simply, a vault. The data storage 105 may also include various indices 145 which provide pointers to the IP within the vault. A computer system 120 (e.g., a personal computer) may be employed by a user to read or remove IP from the vault or to deposit IP information to the vault over a network 125.

A set of vault of services 110 may be built on the IM's secure storage, to allow users to create accounts, deposit information in any electronic form, and read or remove the information. Information may be stored in the vault 105 and encrypted by the vault 105. In addition, the IM vault services 110 are provided to allow a user (e.g., an IP producer) to specify conditions, in a secure way via technologies of the existing public key infrastructure (PKI), so that a second party 125 (e.g., a consumer of IP) may have read access to certain, sharable portions of the user's IP.

Using this approach, the first party 120 may provide the second party 125 permission to read an agreed upon set of IP such as articles, research, books, music, video, data or the like. As a trusted third party for information, then, the vault 105 of IM 100 significantly contributes to the elimination of the escalating dangers of theft, and significantly increases commercial availability of the IP overall. The IM 100 may also provide for financial transactions and payment collection upon sale of the IP, as denoted by reference numeral 130.

Also included are vault services 110 for accessing and updating the vault 105, one or more data objects 115 such as files containing research, music, movies, books, contact management control data, telephone numbers, birthday information, family names, email addresses, or other personal data. The system may also include devices used by users of the vault who may employ computers, personal digital assistants (PDAs), telephones, or the like.

A certificate authority 140 may create an authorized certificate (e.g., a digital certificate) for any user of the system which may be presented during transactions to facilitate authenticating a user. Accesses to the vault typically use the first and/or second party's public keys as identification along with the authorized certificate. To share information with a second party, a contract data token specifying the two parties' public keys may be created and digitally signed by the first party's private key to ensure that access to private information is not propagated beyond the second party. This dual key mechanism is a typical way to authenticate a transaction, of which an example of an implementation may be found in co pending U.S. patent application Ser. No. 10/965,592, incorporated by reference herein.

Figure 2A:
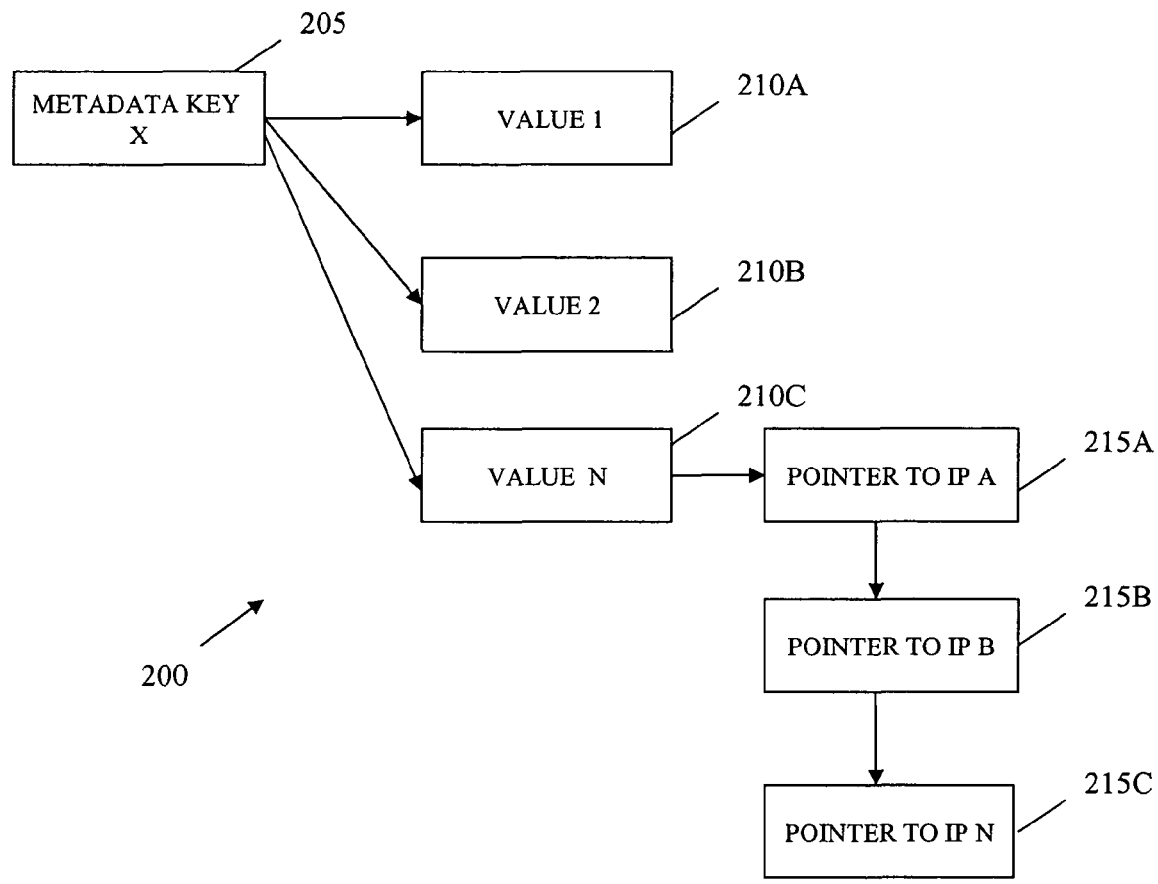
FIG. 2A is an illustrative embodiment of indices to IP typically stored in the vault of the Information Marketplace.

FIG. 2A is an illustrative embodiment of indices (e.g., indices 145) to IP typically stored in the vault of the IM, generally denoted as reference numeral 200. The one or more indices for the information marketplace may be collections of key/value pairs and pointer(s) to IP stored within the IM 100 vault. For example, metadata key X, 205, may link to associated values 210a-210c, each value 210a-210b reflecting a distinctive type of data such as, for example, movies, plain text, music, pictures, or the like. Further, the values 210a-210c may also categorize IP by genre such as "jazz", "classical", "rock and roll", or other types of music, for example. Each value 210a-210c may link to a list of one or more pointers 215a-215c to individual IP objects. In embodiments, the order of the list may reflect the popularity of IP within the list (e.g., consumption statistics, such as the number of sells and views for a particular IP, may promote the IP higher in the list).

The individual indices may have a core set of metadata, or a template that pertains to a type of data. The template may map to standard metadata that the IP may have within the vault. In addition to the core templates, additional metadata pairs may be created to specify individual IP more thoroughly.

Figure 2B:
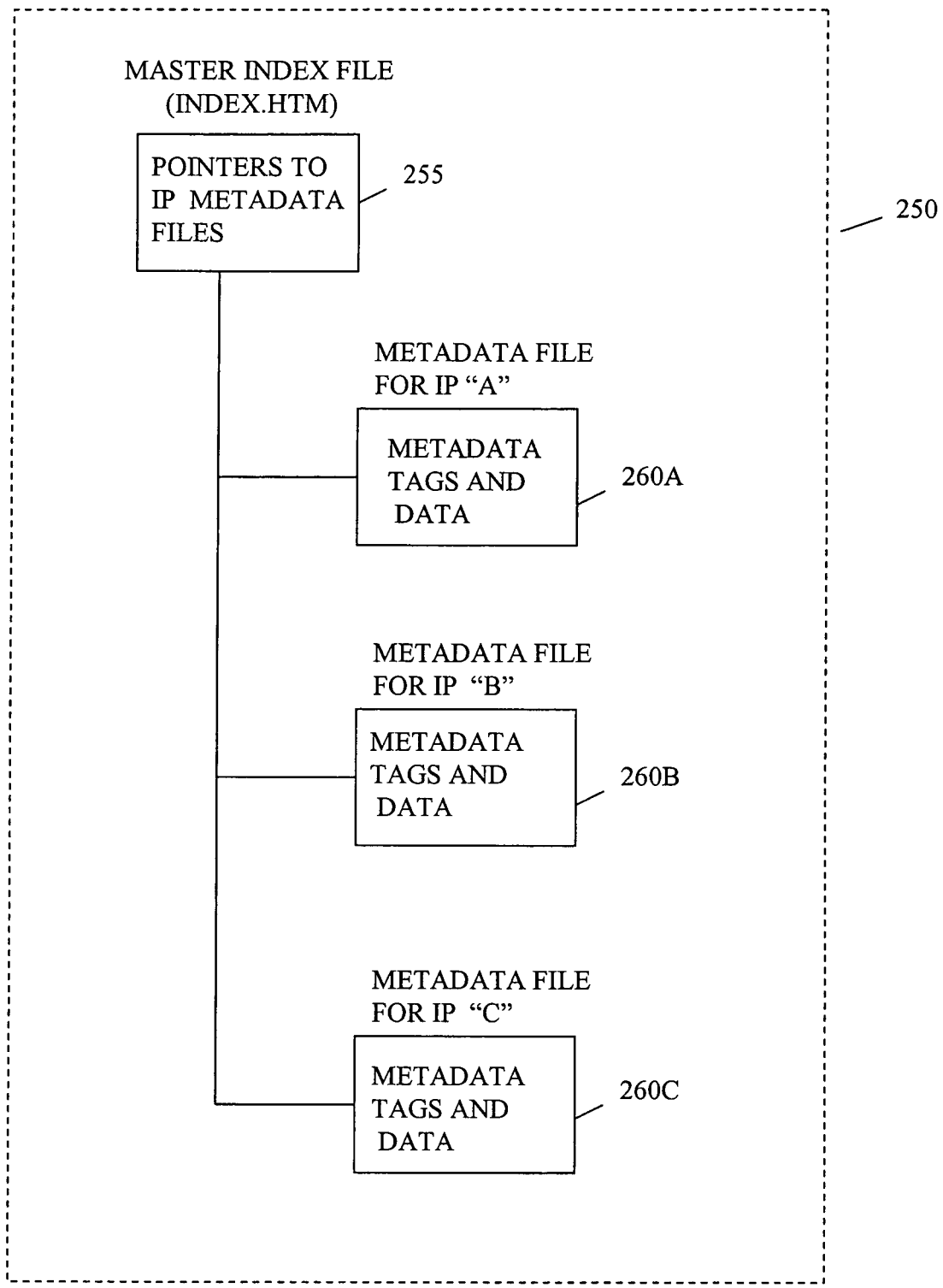
FIG. 2B is an illustrative embodiment of a searchable directory.

FIG. 2B is an illustrative embodiment of a searchable directory, denoted by reference numeral 250. The searchable directory includes one or more metadata files 260A-260C that may be created for each IP (e.g., "A", "B", "C", respectively) for access by web search engine crawlers, or the like. A master index file 255 may be created to link to all the IP metadata files to facilitate search engine crawlers in finding the metadata about each IP in the vault of the Information marketplace 100. This searchable directory 250 may be an Internet accessible web site managed by or associated with the Information Marketplace 100.

Figure 3:
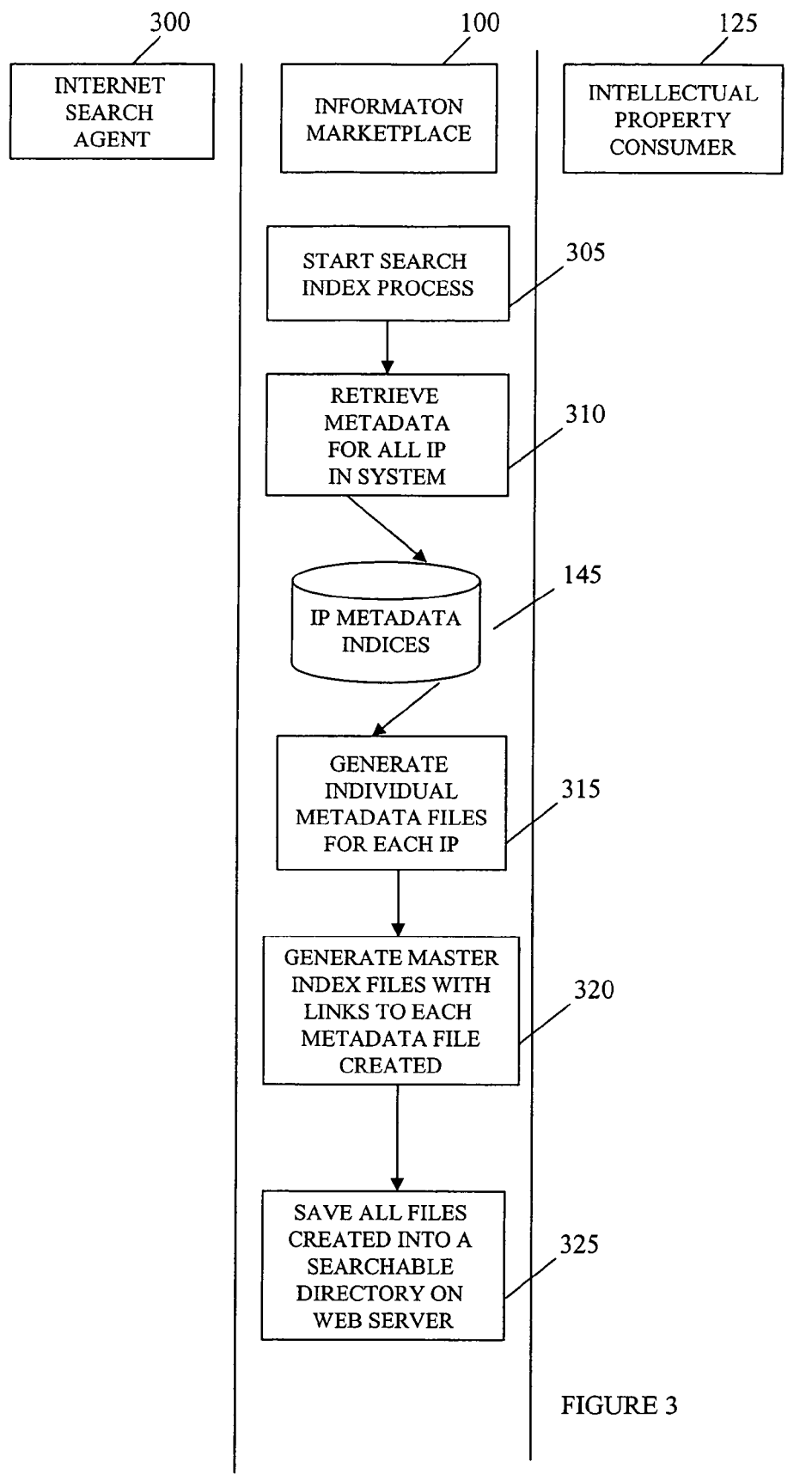
FIG. 3 is a swim lane diagram of an embodiment showing steps of creating IP metadata files for outside search engines.

FIG. 3 is a swim lane diagram of an embodiment showing steps of creating IP metadata files for outside search engines, starting at step 305. "Swim lane" diagrams may be used to show the relationship between the various "actors" in the processes and to define the steps involved in the processes. FIG. 3 (and all the other Figures employing swim lane diagrams) may equally represent a high-level block diagram of components of the invention implementing the steps thereof. The steps of FIG. 3 (and all the other Figures employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 3 (and the other swim lane diagrams) may also be implemented by the embodiment of FIG. 1.

At step 305, a periodic process begins that searches the IM indexes. At step 310, metadata may be retrieved from the IP metadata indices (e.g. indices 145) for all or portions of the IP in the IM. At step 315, individual metadata files may be generated for each IP. This may include collating all keyword data pairs for each IP and creating a separate hyper-text markup language (HTML) file for each IP. The HTML file may contain a meta tag for notifying search robots not to follow and index (e.g., META name="robots"), and another meta tag containing the keyword pairs (e.g., META name="keyword"). These HTML files may be written to a specific directory that may be accessible through the Internet.

At step 320, a master index file may be generated having individual links to each metadata file created. A meta tag "ROBOTS" entry in this master file informs search agents to follow the links, but not to index the master file, itself (e.g., a CONTENT entry of "FOLLOW,NOINDEX"). At step 325, all master index files may be saved into a searchable directory on an appropriate web server.

Figure 4:
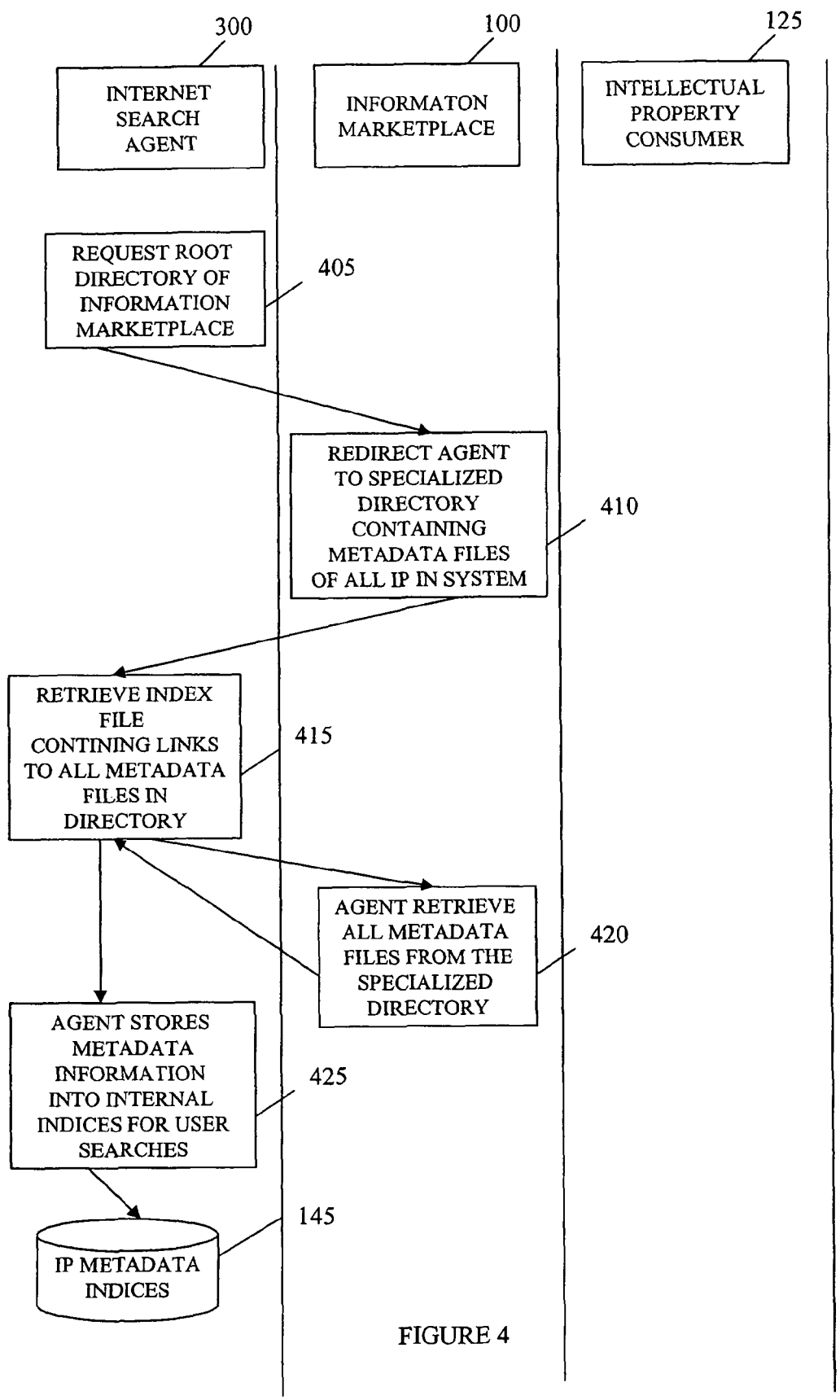
FIG. 4 is a swim lane diagram of an embodiment showing steps of processing search agents requests.

FIG. 4 is a swim lane diagram of an embodiment showing steps of processing search agents requests, starting at step 405 where a search agent requests a root directory of the IM. At step 410, the request may be redirected to the searchable directory (e.g., the one or more master index files) containing metadata files of the indexed IP in the IM, which is typically not the primary page(s) that consumers use. The directory typically contains an HTML file for each IP in the IM containing metadata. The directory may also contain the master index file with links to each of the metadata documents thereby permitting search engines to discover meta information for all IP in the IM.

At step 415, the master index file containing links to the metadata files in the searchable directory may be retrieved. At step 420, the search agent may retrieve the metadata files specified in the searchable directory of the IM. At step 425, the search agent may store the metadata information into internal indices (e.g., indices 145) for user searches. URLs to individual metadata documents may also be added to the search engine index of searchable files.

Figure 5A:
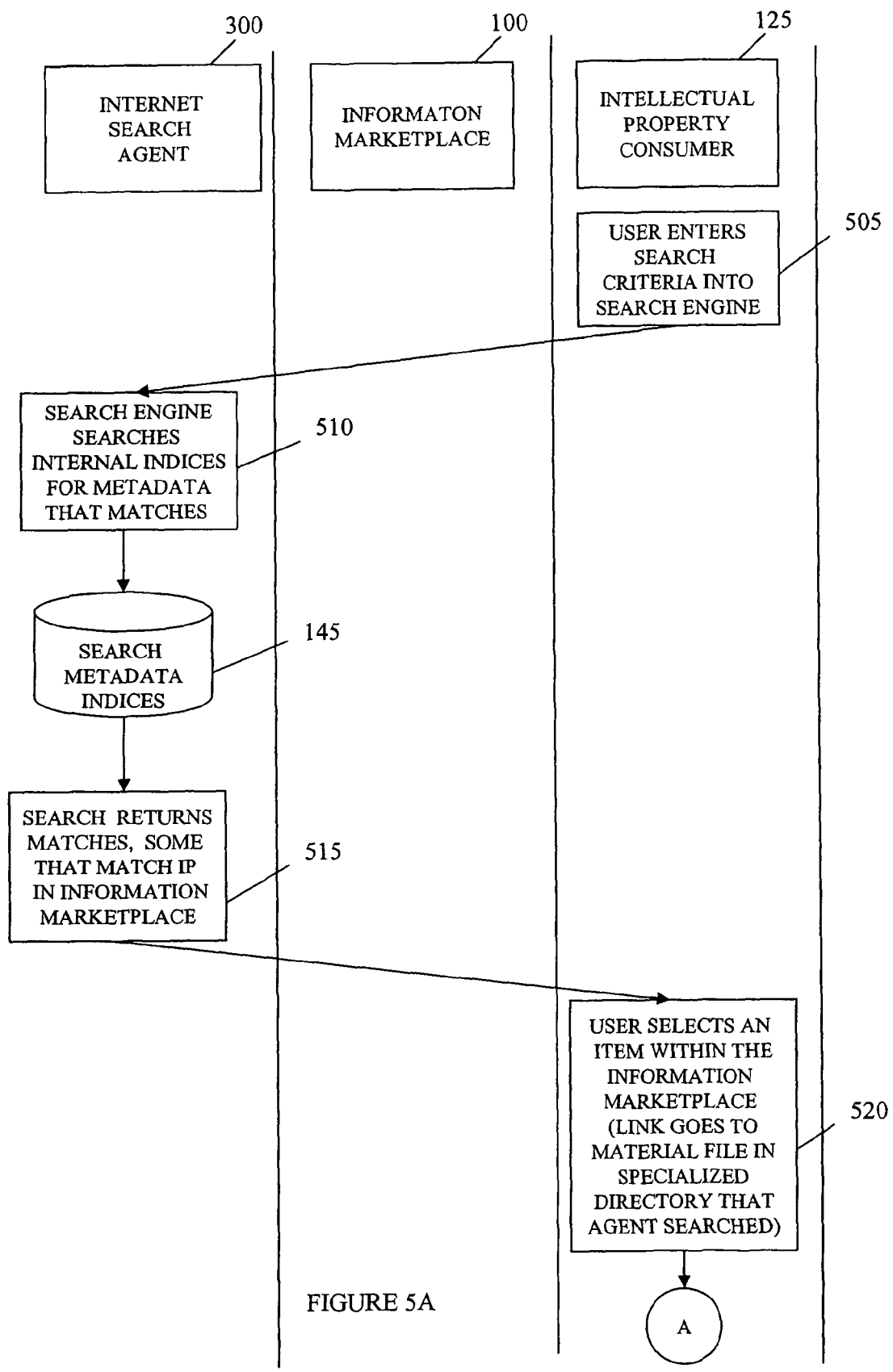

FIGS. 5A and 5B are swim lane diagrams of an embodiment showing steps of a user entering the Information Marketplace through an outside search site. Beginning at step 505, a user enters search criteria into a search engine. At step 510, the search engine searches internal indices (e.g., indices 145) that it had previously indexed, for metadata that matches the criteria. At step 515, the search engine may return matches (or "hits") to the user usually via a browser; some or all of which may be IP in the IM. At step 520, the user may select (e.g., by clicking on a link) an item within the IM. Instead of displaying the metadata file, the user may be forwarded to one of two pages, using known methods. At optional step 525, the user may be forwarded to the login screen page if the user is not currently logged into the IM, and optional step 530, the user logs into the IM. At step 535, the IM displays dynamic graphical user interface (GUI) of the IP for which the user originally selected. In this manner, the intellectual property may be located for commercial, private use or for a transaction.

While the invention has been described in terms of embodiments, those skilled in the art will recognize that the invention can be practiced with modifications and in the spirit and scope of the appended claims.

What is claimed is:

1. A computer implemented method of facilitating on-line searching of an information marketplace (IM), comprising the steps of:
   supplying, by an intellectual property (IP) producer, IP, and IP metadata to the IM in a computer;
   generating one or more metadata files having keyword value pairs from indices to the intellectual property at a commercial or private web site, wherein the indices are internal search indices of the commercial or private web site arranged within the IM that require an authorized certificate to access, and the indices are structured to being crawled by external web search engines;
   creating one or more hyper-text markup language (HTML) files for each IP;
   storing the one or more metadata files within the one or more HTML files in a directory accessible through the Internet;
   creating a master index file containing one or more links to each of the one or more HTML files;
   saving the master index file and the one or more HTML files in a searchable directory of the IM; and
   accessing at least one of the one or more HTML files via the one or more links to locate the IP for commercial or private use, the accessing comprising:
      redirecting requests from the external web search engines to the searchable directory;
      executing the requests from the external web search engines on the searchable directory for the one or more HTML files;
      transmitting the one or more HTML files from the searchable directory to the external web search engines; and
      restricting access of the external web search engines to other directories which require the authorized certificate to access the commercial or private web site.

2. The method of claim 1, further comprising crawling through the master index file with a search agent of the external web search engines to create search indices.

3. The method of claim 2, further comprising using a browser to search the search indices for accessing the at least one of the one or more HTML files.

4. The method of claim 1, further comprising: redirecting a search agent of the external web search engines to the searchable directory; retrieving the master index file containing the one or more links; and storing metadata information in search indices associated with the search agent for user searches.

5. The method of claim 4, further comprising: entering search criteria into the search agent; searching the search indices and associated metadata to match the search criteria; and returning one or more matching results from the searching step.

6. The method of claim 5, further comprising selecting the one or more matching results.

7. The method of claim 5, further comprising presenting a login screen to the IM when a selection is made from one of the one or more matching results, the selection being for an item of the IP within the IM.

8. The method of claim 7, further comprising determining whether a user is logged into the IM and by-passing the presenting a login screen step if the user is already logged into the IM.

9. The method of claim 7, wherein the IM is the commercial or private web site.

10. The method of claim 1, wherein the method is implemented with the following:
   the IM is coupled to a certificate authority which sends verifications to the IM;
   an IP consumer that issues a search request to the IM, receives search results from the IM, and purchases and receives IP.

11. The method of claim 1, wherein the internal search indices are exposed to the external web search engines such that data is segregated into at least two types which include one layer of search data specifically for the external web search engines and another layer for users.

12. The method of claim 1, further comprising the external web search engines searching the internal search indices, after being indexed, for metadata that matches search criteria, returning the matches that include the IP in the IM to a user via a browser, and the user selecting an item within the IM.

13. The method of claim 1, wherein:
   the indices are associated with a collection of the keyword value pairs and pointers to the IP stored in the IM;
   the keyword value pairs and the pointers are associated with a value;
   the value is associated with a type of data, wherein the type of data categorizes the IP; and
   the one or more HTML files contain at least one meta tag containing the keyword value pairs.

14. A computer implemented method of exposing search indices using an information marketplace (IM), comprising the steps of:
   supplying, by an intellectual property (IP) producer, IP, and IP metadata to the IM in a computer;
   creating one or more metadata files having keyword value pairs from indices of the IM, wherein the indices are internal search indices of a commercial or private website arranged within the IM that require an authorized certificate to access, and the indices are structured to being crawled by external web search engines;
   creating one or more hyper-text markup language (HTML) files for each IP;
   storing the one or more metadata files in a directory accessible through a network;
   creating a master index file containing one or more links to each of the one or more HTML files;
   saving the master index file and the one or more HTML, files in a searchable directory of the IM; and
   accessing at least one of the one or more HTML files via the one or more links to locate the IP for at least any one of a transaction, a commercial use and a private use, the accessing comprising:
      redirecting requests from the external web search engines to the searchable directory;
      executing the requests from the external web search engines on the searchable directory for the one or more HTML files;
      transmitting the one or more HTML files from the searchable directory to the external web search engines; and
      restricting access of the external web search engines to other directories which require the authorized certificate to access the commercial or private web site,
   wherein a buyer and a seller are exposed to the one or more links via at least one graphical user interface (GUI) for the HTML files.

15. The method of claim 14, further comprising crawling through the master index file with a search agent of the external web search engines to create public indices for searching.

16. The method of claim 15, further comprising searching the public indices for accessing the at least one of the one or more HTML files.

17. The method of claim 14, further comprising: redirecting a search agent of the external web search engines to the searchable directory; retrieving the master index file containing the one or more links; and storing metadata information in public indices associated with the search agent for subsequent searches.

18. The method of claim 17, further comprising: entering search criteria into the search agent; searching the public indices and associated metadata to match the search criteria; and returning one or more matching results from the searching step.

19. The method of claim 18, further comprising presenting a login screen to the IM when a selection is made from among the one or more matching results, the selection being for an item of IP within the IM.

20. The method of claim 19, further comprising by-passing the presenting a login screen step if a user is already logged into the IM.

21. The method of claim 14, wherein the method is implemented with the following:
   the IM is coupled to a certificate authority which sends verifications to the IM;
   an IP consumer that issues a search request to the IM, receives search results from the IM, and purchases and receives IP.

22. The method of claim 14, wherein the internal search indices are exposed to the external web search engines such that data is segregated into at least two types which include one layer of search data specifically for the external web search engines and another layer for users.

23. The method of claim 14, further comprising the external web search engines searching the internal search indices, after being indexed, for metadata that matches search criteria, returning the matches that include the IP in the IM to a user via a browser, and the user selecting an item within the IM.

24. A system implemented in hardware for facilitating on-line searching, comprising:
   a combination of hardware and computer program code operable to:

allow an intellectual property (IP) producer to supply IP and IP metadata to an information market place (IM);

generate one or more metadata files having keyword value pairs from indices to the IP at a commercial or private web site, wherein the indices are internal search indices of the commercial or private web site arranged within the IM that require an authorized certificate to access, and the indices are structured to being crawled by external web search engines;

create one or more hyper-text markup language (HTML) files for each IP;

store the one or more metadata files within the one or more HTML files in a directory accessible on-line;

create a master index file containing one or more links to each of the one or more HTML, files;

save the master index file and the one or more HTML files in a searchable directory of the IM; and access at least one of the one or more HTML files via the one or more links to locate the IP for at least any one of a transaction, a commercial use and a private use, the accessing comprising:

redirecting requests from the external web search engines to the searchable directory;

executing the requests from the external web search engines on the searchable directory for the one or more HTML files;

transmitting the one or more HTML files from the searchable directory to the external web search engines; and restricting access of the external web search engines to other directories which require the authorized certificate to access the commercial or private web site, a buyer and a seller are exposed to the one or more links to at least one graphical user interface (GUI) for the metadata files.

25. The system of claim 24, wherein the system is further operable to crawl through the master index file with a search agent of the external web search engines to create search indices.

26. The system of claim 25, wherein the system is further operable to use a browser to search the search indices for accessing the at least one of the one or more HTML files.

27. The system of claim 24, wherein the system is further operable to:

redirect a search agent of the external web search engines to the searchable directory;

retrieve the master index file containing the one or more links; and store metadata information in search indices associated with the search agent for user searches.

28. The system of claim 27, wherein the system is further operable to: receive search criteria by the search agent; search the search indices and associated metadata to match the search criteria; and return one or more matching results from the searching.

29. The system of claim 24, wherein the system is further operable to present a login screen to the IM when a selection is made from one of the one or more matching results, the selection being for an item of IP within the IM.

30. The system of claim 29, wherein the system is further operable to determine whether a user is logged into the IM; and by-pass a login sequence if the user is already logged into the IM.

31. The system of claim 24, wherein the system comprises: the IM is coupled to a certificate authority which sends verifications to the IM;

an IP consumer that issues a search request to the IM, receives search results from the IM, and purchases and receives IP.

32. The system of claim 24, wherein the internal search indices are exposed to the external web search engines such that data is segregated into at least two types which include one layer of search data specifically for the external web search engines and another layer for users.

33. The system of claim 24, the system is further operable to allow the external web search engines to search the internal search indices, after being indexed, for metadata that matches search criteria, return the matches that include the IP in the IM to a user via a browser, and allow the user to select an item within the IM.

34. A computer program product comprising a computer usable storage memory having readable program code embodied in the memory, the computer program product is implemented in hardware and includes at least one component to:

supply, by an intellectual property (IP) producer, IP, and IP metadata to an information marketplace (IM);

create one or more metadata files having keyword value pairs from the indices of an IM having the IP, wherein the indices are internal search indices of a commercial or private website arranged within the IM that require an authorized certificate to access, and the indices are structured to being crawled by external web search engines;

create one or more hyper-text markup language (HTML) files for each IP;

store the one or more metadata files within the one or more HTML files in a directory accessible through a network;

create a master index file containing one or more links to each of the one or more HTML files;

save the master index file and the one or more HTML files in a searchable directory of the IM; and access at least one of the one or more HTML files via the one or more links to locate the IP for at least any one of a transaction, commercial use, and a private use, the accessing comprising:

redirecting requests from the external web search engines to the searchable directory;

executing the requests from the external web search engines on the searchable directory for the one or more HTML files;

transmitting the one or more HTML files from the searchable directory to the external web search engines; and restricting access of the external web search engines to other directories which require the authorized certificate to access the commercial or private web site.

35. The product of claim 34, wherein the internal search indices are exposed to the external web search engines such that data is segregated into at least two types which include one layer of search data specifically for the external web search engines and another layer for users.

36. The product of claim 34, further comprising allowing the external web search engines to search the internal search indices, after being indexed, for metadata that matches search criteria, returning the matches that include the IP in the IM to a user via a browser, and allowing the user to select an item within the IM.

* * * * *